(12) United States Patent
Jenny et al.

(10) Patent No.: US 7,678,840 B2
(45) Date of Patent: Mar. 16, 2010

(54) REDUCTION OF MDI EMISSIONS IN CAVITY FILLING NVH POLYURETHANE FOAMS

(75) Inventors: Jack W. Jenny, Pittsburgh, PA (US); David A. Radovich, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 235 days.

(21) Appl. No.: 11/604,953

(22) Filed: Nov. 28, 2006

(65) Prior Publication Data

US 2008/0125508 A1    May 29, 2008

(51) Int. Cl.
*C08G 18/06* (2006.01)

(52) U.S. Cl. ............... 521/130; 521/137; 521/170; 521/174

(58) Field of Classification Search ............ 521/130, 521/137, 170, 174
See application file for complete search history.

(56) References Cited

U.S. PATENT DOCUMENTS

| | | | |
|---|---|---|---|
| 4,129,696 A | 12/1978 | Markusch et al. | 521/154 |
| 4,888,365 A | 12/1989 | Riley et al. | 521/157 |
| 5,175,195 A | 12/1992 | Tani et al. | 521/159 |
| 5,334,689 A | 8/1994 | Muller et al. | 528/67 |
| 5,484,820 A | 1/1996 | Mispreuve et al. | 521/174 |
| 5,817,860 A | 10/1998 | Rizk et al. | 560/25 |
| 5,968,995 A | 10/1999 | Rizk et al. | 521/159 |
| 6,136,879 A | 10/2000 | Nishida et al. | 521/174 |
| 6,224,800 B1 * | 5/2001 | Rosthauser | 264/122 |
| 6,423,755 B1 | 7/2002 | Allen et al. | 521/111 |
| 6,541,534 B2 | 4/2003 | Allen et al. | 521/174 |
| 6,617,368 B2 * | 9/2003 | Steppan et al. | 521/159 |
| 6,699,916 B2 | 3/2004 | Lekovic et al. | 521/130 |
| 6,762,214 B1 * | 7/2004 | Tracy et al. | 521/174 |
| 6,803,390 B2 | 10/2004 | Lekovic et al. | 521/159 |

FOREIGN PATENT DOCUMENTS

| | | |
|---|---|---|
| EP | 239 891 A2 | 10/1987 |
| GB | 2 232 676 A | 12/1990 |
| WO | 98/33833 | 8/1998 |

OTHER PUBLICATIONS

SAE Technical Paper Series, May 1999, p. 1-5, Brad A. Pearson, "New Low MDI Polyurethane Foam System for Acoustical Barrier Applications in the Automotive Industry".

* cited by examiner

*Primary Examiner*—John Cooney
(74) *Attorney, Agent, or Firm*—N. Denise Brown; Noland J. Cheung

(57) ABSTRACT

This invention relates to reactive systems for the production of cavity filling polyurethane foams for NVH (noise vibration and harshness) application areas in which the system exhibits reduced isocyanate emissions. These foams comprises a polyisocyanate comprising a polymethylene poly(phenylisocyanate).

10 Claims, No Drawings

REDUCTION OF MDI EMISSIONS IN CAVITY FILLING NVH POLYURETHANE FOAMS

BACKGROUND OF THE INVENTION

This invention relates to reactive systems for the production of cavity filling polyurethane foams for NVH (noise vibration and harshness) application areas in which the system exhibits reduced isocyanate emissions. These foams comprises a polyisocyanate comprising a polymethylene poly(phenylisocyanate).

Polyurethane cavity filling foams, particularly those having low densities, are suitable replacements for inserted baffles to inhibit noise transmission through automotive body structures as they offer advantages in terms of cost and performance. There is, however, a perceived exposure concern relative to isocyanate (MDI) emissions from the foam reactions for workers in the automotive assembly area where there foams are applied. MDI emissions are typically measured by the "5 gallon can test". This test is documented in the paper titled "New Low MDI. Polyurethane Foam System for Acoustical Barrier Applications in the Automotive Industry" by Brad A. Pearson. This paper was presented at the May 1999 SAE International Meeting—Proceedings of the 1999 Noise and Vibration Conference.

Most earlier attempts to reduce isocyanate emissions in MDI based polymers have aimed to reduce the monomer content by forming a NCO-terminated prepolymer of MDI with an isocyanate-reactive component.

U.S. Pat. Nos. 6,423,755 and 6,541,534 disclose a polyurethane foam and a reactive system for forming a polyurethane foam. The system comprises (1) an isocyanate-reactive component including at least one polyol, a blowing agent and at least one thixotropic agent, and (2) a polyisocyanate component including at least one polyisocyanate compound (preferably an isocyanate prepolymer or quasi-prepolymer of polymeric MDI) and at least one thixotropic agent. At least one of the isocyanate-reactive component and the polyisocyanate component additionally contains hollow microspheres, and both have a Brookfield viscosity of at least about 50,000 cps. It is disclosed in these patents that the prepolymer approach to reduce the level of free MDI can substantially reduce or eliminate the need for engineering controls such as downdraft ventilation.

U.S. Pat. No. 6,803,390 discloses a method of making rigid polyurethane foams from a reactive system comprising (a) a polyisocyanate containing a prepolymer which is the reaction product of an excess of an isocyanate with at least one polyol and at least one hydroxyl-functional acrylate or methacrylate, and (b) a polyol component containing an effective amount of a blowing agent and isocyanate-reactive materials that have an average functionality of at least about 2.3 and include at least one polyol. These systems are also characterized by (c) a volume ratio of isocyanate to polyol of no greater than 10:1, and (d) a ratio of NCO to NCO-reactive groups of from about 0.8:1 to 1.5:1. It also requires that a catalyst be present in at least one of the polyisocyanate component or the polyol component. The presence of primary or secondary amine groups in the catalysts allows them to react into the resultant polymer structure and thereby decreases the level of volative components.

Rigid hybrid polyurethane foams are described in U.S. Pat. No. 6,699,916. These foams require volume ratios of less than 4:1 and are prepared from an NCO-terminated prepolymer in which the prepolymer is the reaction product of an isocyanate component, a polyol component and a hydroxyl-functional acrylate or methacrylate. This prepolymer preferably contains less than 25% of monomeric diisocyanates which substantially reduces the risks of polyisocyanate inhalation exposure.

Polyisocyanate prepolymers are also disclosed in U.S. Pat. Nos. 5,817,860 and 5,968,995. These prepolymers comprise the reaction product of (a) a polyisocyanate having a functionality of at least 2, and contain at least about 20% by wt. of a diisocyanate monomer, (b) a monohydric alcohol and (c) a polyol having an average hydroxyl functionality of at least about 1.8 to at most about 3.2. The prepolymer is characterized by (i) a sufficient quantity of isocyanate groups to react with water in the absence of a supplemental blowing agent to make a foam, (ii) at most about 10% by wt. of diisocyanate monomer, and (iii) a sufficient amount of polyisocyanate capped by monohydric alcohol to prevent gelling of the prepolymer.

Advantages of the present invention include the ability to control and/or reduce the emissions of free MDI in cavity filling foams. The present invention does not require prepolymers of polyisocyanates or other conventional approaches to this problem, but achieves significant reductions in the emission of free MDI.

SUMMARY OF THE INVENTION

This invention relates to reactive systems suitable for cavity filling polyurethane foams in which the system exhibits reduced or decreased isocyanate emissions. The resultant polyurethane foams may be low-density, acoustic type foams or high-density, structural foams, as well as any type of foam in between these. The reactive systems required by the present invention comprise a polyisocyanate component and an isocyanate-reactive component, in the presence of at least one catalyst and water, wherein the isocyanate index is less than 100. The polyisocyanate of these systems comprises a polymethylene poly(phenylisocyanate).

DETAILED DESCRIPTION OF THE INVENTION

Suitable polyisocyanate components for the reactive systems of the present invention comprise a polymethylene poly (phenylisocyanate). Suitable polymethylene poly(phenylisocyanates) of the present invention include those which have (i) a polymeric content of greater than or equal to 55% by weight, and (ii) a monomeric MDI content of less than or equal to 45%, with the sum of the polymeric isocyanate content and of the monomeric isocyanate content totaling 100% by weight of the polyisocyanate.

In accordance with the present invention, it is preferred that the polymethylene poly(phenylisocyanates) of the present invention has a polymeric isocyanate content of greater than or equal to about 60% by weight and a monomeric isocyanate content of less than or equal to about 40% by weight, more preferably a polymeric isocyanate content of greater than or equal to about 65% by weight and a monomeric isocyanate content of less than or equal to 35% by weight, most preferably a polymeric isocyanate content of greater than or equal to 70% by weight and a monomeric isocyanate content of less than or equal to about 30% by weight, and most particularly preferably a polymeric isocyanate content of greater than or equal to about 75% by weight and a monomeric isocyanate content of less than or equal to about 25% by weight. As is understood by one of ordinary skill in the art, the sum of the polymeric isocyanate content and of the monomeric isocyanate content always totals 100% by weight of the polymethylene poly(phenylisocyanate) component.

In addition, the polymethylene poly(phenylisocyanate) component should contain less than or equal to 10% by weight of the 2,4'-isomer of diphenylmethane diisocyanate, based on 100% by weight of the polymethylene poly(phenylisocyanate). It is preferred that the 2,4'-isomer content is less than or equal to 8% by weight, more preferably less than or equal to 5% by weight, and most preferably less than or equal to 3% by weight, based on 100% by weight of the polymethylene poly(phenylisocyanate).

The polymethylene poly(phenylisocyanate) component of the present invention should contain less than or equal to 42% by weight of the 4,4'-isomer, preferably less than or equal to 35% by weight of the 4,4'-isomer, more preferably less than or equal to 30% by weight of the 4,4'-isomer and most preferably less than or equal to 25% of the 4,4'-isomer, based on 100% by weight of the polymethylene poly(phenylisocyanate).

The amount of 2,2'-isomer present in the polymethylene poly(phenylisocyanate) in any given embodiment of the present invention is typically less than or equal to 6% by weight, preferably less than or equal to 4% by weight, more preferably less than or equal to 2% by weight, and most preferably less than or equal to 1% by weight.

In accordance with the present invention, the sum of the % by weight of polymeric isocyanate and of the % by weight of monomeric isocyanate always totals 100% by weight of the polymethylene poly(phenylisocyanate). Also, the sum of the %'s by weight of the individual isomers (i.e. 2,2'-, 2,4'- and/or 4,4'-) of monomeric isocyanate and the % by weight of the polymeric isocyanate always totals 100% by weight of the polymethylene poly(phenylisocyanate). Thus, it is apparent that the sum of the %'s by weight of the individual isomers (i.e. 2,2'-, 2,4'- and/or 4,4'-) is equal to the % by weight of monomeric isocyanate. As an example, when the monomeric isocyanate content is 40% by weight, the sum of the % by weight of the 4,4'-isomer, the % by weight of the 2,4'-isomer and of the % by weight of the 2,2'-isomer equals 40% by weight.

A preferred polymethylene poly(phenylisocyanate) of the present invention has (i) a polymeric isocyanate content of greater than or equal to 55% by weight, and (ii) a monomeric MDI content of less than or equal to 45%, by weight, with the sum of the polymeric content and of the monomeric content totaling 100% by weight of the polyisocyanate. In this preferred polyisocyanate, the amount of the 4,4'-isomer of MDI is less than or equal to 42% by weight, the amount of the 2,4'-isomer is less than or equal to 3% by weight and the amount of the 2,2'-isomer is less than or equal to 1% by weight, with the sum of the %'s by weight of the 4,4'-isomer, the 2,4'-isomer and the 2,2'-isomer totaling 45% by weight, i.e. the total weight of the monomeric isocyanate content.

Another preferred polymethylene poly(phenylisocyanate) of the present invention has (i) a polymeric isocyanate content of greater than or equal to 65% by weight, and (ii) a monomeric MDI content of less than or equal to 35% by weight. In addition, the amount of the 4,4'-isomer of MDI present is less than or equal to about 30% by weight, the amount of the 2,4'-isomer of MDI is less than or equal to 4% by weight, and the amount of the 2,2'-isomer is less than or equal to 2% by weight, with the sum of the %'s by weight of the 4,4'-isomer, the 2,4'-isomer and the 2,2'-isomer totaling 35% by weight, i.e. the total weight of the monomeric isocyanate content.

Another preferred polymethylene poly(phenylisocyanate) to be used in the present invention has (i) a polymeric isocyanate content of greater than or equal to 70% by weight, and (ii) a monomeric isocyanate content of less than or equal to 30% by weight. In addition, the amount of the 4,4'-isomer of MDI present is less than or equal to about 25% by weight, the amount of the 2,4'-isomer of MDI is less than or equal to 5% by weight, and the amount of the 2,2'-isomer is less than or equal to 1% by weight, with the sum of the %'s by weight of the 4,4'-isomer, the 2,4'-isomer and the 2,2'-isomer totaling 30% by weight, i.e. the total weight of the monomeric isocyanate content.

Suitable isocyanate-reactive components to be used as component (B) in accordance with the present invention include, for example, compounds containing at least two hydrogen atoms, which are reactive with isocyanate groups and are commonly referred to as polyol components. Virtually any isocyanate-reactive component known to be suitable for the preparation of polyurethane foams is suitable herein. Such isocyanate-reactive components include, for example, but are not limited to polyether polyols, polyester polyols, polythioether polyols, polymer polyols, PHD polyols, polycarbonate polyols, polyoxyalkylene polyethers, crosslinking agents, chain extending agents, etc.

A preferred isocyanate-reactive component that is suitable for producing foams which exhibit low MDI emissions comprises (1) at least one filled polyol or polymer polyol component, and (2) at least one amine-initiated polyol.

The filled polyol or polymer polyol component comprises one or more free-radically polymerized ethylenically unsaturated monomers in a base polyol. These polymer polyols are characterized by a functionality of from about 2 to about 6, preferably from about 2 to about 4, a molecular weight of about 1000 to about 10,000, preferably from about 2000 to about 8500, and as having from about 20 to about 60% by weight solids, preferably from about 25 to about 45% by weight solids. In accordance with the present invention, it is preferred that the base polyol used to prepare the polymer polyol component is not an amine-initiated polyol.

The amine-initiated polyol component comprises one or more amine-initiated polyols having a hydroxyl functionality of about 2 to 6, and preferably about 2 to 4. The amine-initiated polyol component typically has a molecular weight of at least about 100, preferably at least about 150 and more preferably at least about 200. The amine-initiated polyol component also typically has a molecular weight of less than or equal to about 4500, preferably less than or equal to about 4000, preferably less than about 1000 and most preferably less than or equal to about 400. For example, the amine-initiated polyol component may have a molecular weight of from at least about 100 to less than or equal to about 4500, preferably of at least about 150 to less than or equal to about 4000, more preferably of at least about 200 to less than about 1000, and most preferably of at least about 200 to less than or equal to about 400.

Suitable catalysts to be used as component (C) in accordance with the present invention include, for example, the known amine catalysts and metal catalysts which are known in the art to be suitable for preparing polyurethane foams. Such catalysts include, but are not limited to, acid blocked amines (i.e. delayed action catalysts), amine gel catalysts, organic acid blocked tertiary amines, organic metal compounds, especially organic tin, bismuth, and zinc compounds, and including those which contain sulfur, etc.

Some examples of suitable tertiary amine catalysts include triethylamine, tributylamine, N-methylmorpholine, N-ethylmorpholine, N,N,N',N'-tetramethylethylene diamine, pentamethyldiethylene triamine, and higher homologues, 1,4-diazabicyclo[2.2.1]octane, N-methyl-N'-(dimethylaminoethyl)-piperazine, bis(dimethylaminoalkyl) piperazines, N,N-dimethylcyclohexylamine, N,N-diethylbenzylamine, bis(N,N-diethylaminoethyl)adipate, N,N,N',N'-tetramethyl-1,3-butane-diamine, N,N,-dimethyl-β-phenylethylamine, 1,2-dimethylimidazole, 2-methylimidazole, monocyclic and bicyclic amidines, bis(dialkylamino) alkyl esters, and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate-reactive hydrogen atoms. Examples of such catalysts include thietahnolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines.

Other suitable catalysts include acid blocked amines (i.e. delayed action catalysts). Examples of acid-blocked amine catalysts include DABCO® 8154 catalyst based on 1,4-diazabicyclo[2.2.2]octane and DABCO® BL-17 catalyst based on bis(N,N-dimethylaminoethyl) ether (available from Air Products and Chemicals, Inc., Allentown, Pa.) and POLYCAT® SA-1, POLYCAT® SA-102, and POLYCAT® SA-610/50 catalysts based on POLYCAT® DBU amine catalyst (available from Air Products and Chemicals, Inc.) as are known and described in, for example, U.S. Pat. No. 5,973, 099, the disclosure of which is herein incorporated by reference.

Suitable organic acid blocked amine gel catalysts which may be employed include the acid blocked amines of triethylene-diamine, N-ethyl or methyl morpholine, N,N dimethylamine, N-ethyl or methyl morpholine, N,N dimethylaminoethyl morpholine, N-butyl-morpholine, N,N'dimethylpiperazine, bis(dimethylamino-alkyl)-piperazines, 1,2 dimethyl imidazole, dimethyl cyclohexylamine. The blocking agent can be an organic carboxylic acid having 1 to 20 carbon atoms, preferably 1-2 carbon atoms. Examples of blocking agents include 2-ethyl-hexanoic acid and formic acid. Any stoichiometric ratio can be employed with one acid equivalent blocking one amine group equivalent being preferred. The tertiary amine salt of the organic carboxylic acid can be formed in situ, or it can be added to the polyol composition ingredients as a salt. To this end, quaternary ammonium salts are particularly useful.

Other suitable amine catalysts include the organic acid blocked tertiary amines. Suitable organic carboxylic acids used to block the tertiary amine gel catalysts, if needed to provide a time delayed action, include mono- or dicarboxylic acids having 1-20 carbon atoms, such as formic, acetic, propionic, butyric, caproic, 2-ethyl-hexanoic, caprylic, cyanoacetic, pyruvic, benzoic, oxalic, malonic, succinic, and maleic acids, with formic acid being preferred.

The delayed action gel catalysts may be fully blocked or partially blocked with an organic carboxylic acid to yield a respective, blocked fully tertiary amine salt of the organic carboxylic acid or a partial salt of the organic carboxylic acid. The amount of organic carboxylic acid reacted with the tertiary amine gel catalyst depends upon the degree to which one desires to delay the tertiary amine catalytic activity.

Other acid blocked amine catalysts suitable for the present invention include those described in, for example U.S. Pat. Nos. 4,219,624, 5,112,878, 5,183,583, 6,395,796, 6,432,864 and 6,525,107, the disclosures of which are herein incorporated by reference.

Other suitable catalysts include organic metal compounds, especially organic tin, bismuth and zinc compounds. Suitable organic tin compounds include those containing sulfur, such as dioctyl tin mercaptide, and, preferably, tin(II) salts of carboxylic acids, such as tin(II)acetate, tin(II)octoate, tin(II)ethylhexoate, and tin(II)laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art. Suitable zinc compounds include zinc neodecanoate and zinc-versalate. Mixed metal salts containing more than one metal (such as carboxylic acid salts containing both zinc and bismuth) are also suitable catalysts.

Further representatives of catalysts to be used according to the invention and details concerning their mode of action are described in Kunstoff Handbuch, Volume VII, published by Vieweg and Hochtlen, Carl-Hanser-Verlag, Munich, 1966, for example, on pages 96-102.

The blowing agent in the present invention comprises water. Depending on the type of foam which is to be prepared, the quantity of water will vary. For example, when preparing a structural foam, the % by weight of water typically varies from about 0.1 to about 1.1% by weight, based on 100% by weight of the isocyanate-reactive component (B). When preparing acoustic foams, the % by weight of water may vary from about 1.5% to about 10%, preferably from about 2.5% to about 7%, more preferably from about 4 to about 6% by weight, based on 100% by weight of the isocyanate-reactive component (B).

In accordance with the present invention, an Isocyanate Index of less than 100, and preferably less than or equal to 90, is generally suitable. By the term "Isocyanate Index", also commonly referred to as the "NCO Index", is defined as used herein as the equivalents of isocyanate divided by the total equivalents of isocyanate-reactive hydrogen containing materials, multiplied by 100. It is preferred that the Isocyanate Index be less than or equal to 90, more preferably less than or equal to 80 and most preferably less than or equal to 75.

The reactive systems of the present invention are suitable for the production of foam by mixing the polyisocyanate component with an isocyanate-reactive component and allowing the reactants to fully react and form a foam. An advantage of the present invention is that the reaction proceeds rapidly when the components are mixed at ambient to moderately elevated temperatures, such as from about 25° C. to about 45° C., preferably from about 30° C. to about 35° C. This simplifies handling and applying the foam. Another advantage of the present invention is that a variety of commonly available mixing and dispersing equipment can be used because of the low volume ratios of the isocyanate and the polyol components.

In applications of particular interest, the mixed polyol and isocyanate components are dispensed onto a part or assembly where localized reinforcement, corrosion protection, sound insulation or vibration damping is desired. The formulation then cures in place, typically without the addition of further heat or energy for curing. Heating can, however, be used is desired to speed the cure, provided it does not negatively effect the end product.

For acoustic applications, the density of the foam is less than or equal to about 4.0 pcf and preferably less than or equal to about 2.3 pcf. The foam typically also has a density of greater than or equal to about 1.2 pcf and preferably greater than or equal to about 1.6 pcf. The density of the foam may range between any of these upper and lower values, inclusive, e.g. from about 1.2 to about 4.0 pcf, and preferably from about 1.6 to about 2.3 pcf.

For structural applications, the density of the foam may be as high as 30 pcf.

The foam of the invention can be used in a variety of applications to structurally stiffen or reinforce areas to which it is applied. Load beams, pillars, rocker panels, roof rails and headers, cross members, and the like are examples of automotive body structural components that benefit from reinforcement from the foam of this invention. Many of these components are hollow or otherwise define a cavity. In some instances, the entire cavity will be filled by the foam. In other situations, the cavity may only partially be filled to provide increased stiffness or reinforcement in some localized area. In other instances, the foam of the invention will be applied to an area where two structural members meet horizontal structural members.

The polyurethane foams formed from the reactive systems of the present invention should be capable of adhering to a variety of surfaces, including those surfaces comprised of one or more metals, carbon fiber(s), plastics and/or polymers.

Since the polyurethane foams prepared from the reactive systems of the present invention typically are cavity filling foams, the quantity of reactants used to fill a specific cavity should be sufficient to completely fill the cavity. There is typically some shrinkage that occurs. Shrinkage is acceptable in the present invention, provided that the prepared foam maintains surface contact with the surface which forms the cavity. In the present invention, this shrinkage should be less than about 1% by volume, based on the total volume of the cavity.

Generally, the reactivity of the systems of the invention that are suitable for acoustical foams should be relatively fast. This is particularly true when the foams are cavity filling foams. More specifically, these systems should react in less than about 20 seconds. On the other hand, the reactivity of systems for structural foams is not of particular importance.

As used herein, the term molecular weight refers to the number average molecular weight ($M_n$) and is determined by end group analysis (OH number).

As used herein, the phrase reduced isocyanate emissions or decreased isocyanate emissions means that the system of the invention exhibits a decrease in the quantity of free MDI when compared to an otherwise identical system except that a polymethylene poly(phenylisocyanate) or diphenylmethane diisocyanate component of the other system does not satisfy the requirements of the isocyanate component required by the present invention.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of the present invention:

Isocyanate A: a polymethylene poly(phenylisocyanate) having an NCO group content of about 31.5% and comprises a polymeric content of about 56% by weight and a monomeric content of about 44% by weight, in which the monomer is made up of about 2% by weight of the 2,4'-isomer and about 42% by weight the 4,4'-isomer.

Isocyanate B: a polymethylene poly(phenylisocyanate) having an NCO group content of about 30.5%, a polymeric content of about 70% by weight and a monomeric content of about 30% by weight, in which the monomer is made up of about 5% of the 2,4'-isomer and about 25% of the 4,4'-isomer.

A polyol blend (Polyol Blend A) having an average molecular weight of about 6425 and an average functionality of about 3.1 was used in all of the working examples. This polyol blend comprised at least one polymer polyol which contained about 43% by weight of solids (i.e. SAN), and at least one amine-initiated polyether polyol.

Two different types of foam (i.e. acoustic and structural) were prepared from the above isocyanates and Polyol Blend A.

For the acoustic foam, 4.9% by weight of water was combined with 100% by weight of Polyol Blend A. This mixture was then combined with the Isocyanate component as shown in Table 1 at the various indices, and allowed to react, thereby forming acoustic foams.

For the structural foam, about 0.9% by weight of water was added to 100% by weight of Polyol Blend A. This mixture was then combined with the Isocyanate component as shown in Table 2 at the various indices and allowed to react, thereby forming structural foams.

Each isocyanate was mixed with Polyol Blend A using typical high pressure polyurethane metering equipment at the ratios identified below. The mixing pressures were approx. 2000 psi (for both the A-side and the B-side), and the process material temperatures were approx. 35° C. (i.e. 95° F.).

The amount of free MDI (i.e. the 4,4'-MDI isomer) from each isocyanates in the following examples was measured in accordance with the "5 Gallon Can Test". The "5 Gallon Can Test" used was as described by Brad A. Pearson in "New Low MDI Polyurethane Foam System for Acoustical Barrier Applications in the Automotive Industry" at the Noise and Vibration Conference & Exposition, May 1999, SAE Technical Paper Series No. 1999-01-1671. A description of this test is set forth below.

Five Gallon Can Test: This test involved filling 5 gallon metal cans approximately halfway with foam (300 grams). The test apparatus was closed-loop, with MDI filter cassettes placed near the center of the top of the can. Monitoring time was previously found to have a direct effect on ppb values for this type of testing. To eliminate this factor, the mass of MDI (in mg) collected on the 13 mm filter was chosen as the critical test result. The can head-space was monitored for 10 minutes following dispensing of the foam.

| | |
|---|---|
| Avg. Flow Rate: | 1.500 lpm |
| Sample Time: | 10 minutes |
| Sample Volume: | 15.00 liters |
| Limit of Quantitation: | 0.1 µg |

Using the 5 gallon test method as described above, the free MDI was measured at different Isocyanate Indices.

The results for Acoustic Foams are set forth in Table 1 and the results for Structural Foams are set forth in Table 2. The results of each example in the Tables are the average of 10 runs.

TABLE 1

Acoustic Foam

| Isocyanate Index (Ratio of Isocyanate: Polyol Blend A) | µg 4,4'-MDI from Foam Prepared from Isocyanate A | µg 4,4'-MDI from Foam Prepared from Isocyanate B |
|---|---|---|
| 60 (0.6:1.0) | <0.1 | <0.1 |
| 80 (0.8:1.0) | 0.668 | 0.216 |
| 100 (1.0:1.0) | 1.277 | 0.875 |

TABLE 2

Structural Foam

| Isocyanate Index (Ratio of Isocyanate: Polyol Blend A) | µg 4,4'-MDI from Foam Prepared from Isocyanate A | µg 4,4'-MDI from Foam Prepared from Isocyanate B |
|---|---|---|
| 60 (0.6:1.0) | 0.56 | 0.43 |
| 80 (0.8:1.0) | NA | 1.25 |
| 100 (1.0:1.0) | 16.42 | 8.92 |

It is readily apparent from the results in Tables 1 and 2 above, that a lower Isocyanate Index (i.e. a lower ratio of isocyanate to polyol) for a given system with the presently required polyisocyanate component results in reduced free MDI emissions. These results also demonstrate that the free MDI which results from the two Isocyanate components at a given Isocyanate Index varies with the monomer content of the Isocyanate component.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reactive system suitable for the production of a polyurethane foam which exhibits decreased isocyanate emissions, and comprises:
    (A) a polyisocyanate component comprising a polymethylene poly(phenylisocyanate) having a polymeric isocyanate component content of greater than 70% by weight and a monomeric isocyanate component present in an amount of less than 30% by weight, with the sum of polymeric and monomeric totaling 100% by weight of the polymethylene poly(phenylisocyanate), wherein the monomeric isocyanate component is comprised of less than or equal to about 25% by weight of the 4,4'-isomer of diphenylmethane diisocyanate, less than or equal to about 5% by weight of the 2,4'-isomer of diphenylmethane diisocyanate and less than or equal to 2% of the 2,2'-isomer of diphenylmethane diisocyanate, with the sum of the 2,2'-isomer, the 2,4'-isomer and the 4,4'-isomer totaling the less than 30% by weight monomeric isocyanate based on 100% by weight of said polymethylene poly(phenylisocyanate);
    with
    (B) an isocyanate-reactive component;
    in the presence of
    (C) at least one catalyst
    and
    (D) water,
    wherein the isocyanate-index is less than 100.

2. The reactive system of claim 1, wherein the isocyanate index is less than or equal to 90.

3. The reactive system of claim 1, wherein the isocyanate index is less than or equal to 80.

4. The reactive system of claim 1, in which the polyurethane foam is an acoustic foam having a density of from about 1.2 to about 4.0 pcf.

5. The reactive system of claim 1, in which the polyurethane foam is a structural foam having a density of from less than about 30 pcf.

6. A process of making a polyurethane foam which exhibits decreased isocyanate emissions, comprising reacting:
    (A) a polyisocyanate component comprising a polymethylene poly(phenylisocyanate) having a polymeric isocyanate component content of greater than 70% by weight and a monomeric isocyanate component present in an amount of less than 30% by weight, with the sum of polymeric and monomeric totaling 100% by weight of the polymethylene poly(phenylisocyanate), wherein the monomeric isocyanate component is comprised of less than or equal to about 25% by weight of the 4,4'-isomer of diphenylmethane diisocyanate, less than or equal to about 5% by weight of the 2,4'-isomer of diphenylmethane diisocyanate and less than or equal to 2% of the 2,2'-isomer of diphenylmethane diisocyanate, with the sum of the 2,2'-isomer, the 2,4'-isomer and the 4,4'-isomer totaling the less than 30% by weight monomeric isocyanate based on 100% by weight of said polymethylene poly(phenylisocyanate);
    with
    (B) an isocyanate-reactive component;
    in the presence of
    (C) at least one catalyst
    and
    (D) water,
    wherein the isocyanate-index is less than 100.

7. The process of claim 6, wherein the isocyanate index is less than or equal to 90.

8. The process of claim 6, wherein the isocyanate index is less than or equal to 80.

9. The process of claim 6, wherein the polyurethane foam is an acoustic foam having a density of from about 1.2 to about 4.0 pcf.

10. The process of claim 6, wherein the polyurethane foam is a structural foam having a density of from less than about 30 pcf.

* * * * *